United States Patent [19]

Venable et al.

[11] Patent Number: 4,771,846
[45] Date of Patent: Sep. 20, 1988

[54] APPARATUS FOR ESTABLISHING STEERING FEEL

[75] Inventors: Fredrick D. Venable, Lafayette; Jerry L. Cage, Granger, both of Ind.

[73] Assignee: TRW Inc., Cleveland, Ohio

[21] Appl. No.: 910,204

[22] Filed: Sep. 22, 1986

[51] Int. Cl.⁴ .............................................. B62D 5/00
[52] U.S. Cl. .................................... 180/142; 188/164
[58] Field of Search ............. 180/132, 141, 142, 79.1, 180/79.3, 79; 188/161, 164, 381

[56] References Cited

U.S. PATENT DOCUMENTS

| | | | |
|---|---|---|---|
| 2,804,698 | 9/1957 | Grandmont | 213/75 R |
| 2,860,423 | 11/1958 | Dehmel | 434/45 |
| 3,011,579 | 12/1961 | Milliken, Jr. et al. | 180/142 |
| 3,256,951 | 6/1966 | Hart | 180/133 |
| 3,450,238 | 6/1969 | Adkins | 188/164 |
| 3,704,766 | 12/1972 | Jaeschke | 188/164 |
| 4,003,446 | 1/1977 | Fleury | 180/132 |
| 4,538,698 | 9/1985 | Hashimoto et al. | 180/79.1 |
| 4,558,759 | 12/1985 | Baatrup | 180/132 |
| 4,635,741 | 1/1987 | Morishita | 180/79.1 |

FOREIGN PATENT DOCUMENTS

| | | | |
|---|---|---|---|
| 1947205 | 4/1971 | Fed. Rep. of Germany | 180/142 |
| 2133884 | 2/1972 | Fed. Rep. of Germany | 180/132 |
| 2123933 | 8/1980 | Fed. Rep. of Germany | 180/132 |
| 3,536,563 | 4/1986 | Fed. Rep. of Germany | 180/79.1 |
| 35035 | 3/1977 | Japan | 180/79.1 |
| 510403 | 6/1976 | U.S.S.R. | 180/132 |

Primary Examiner—John J. Love
Assistant Examiner—Everett G. Diederiks, Jr.
Attorney, Agent, or Firm—Tarolli, Sundheim & Covell

[57] ABSTRACT

A steering apparatus for artificially establishing steering feel in a steering system not having a mechanical connection between the steering wheel and the steerable wheels. The apparatus includes a hydraulic steering motor connected to the steerable wheels. A steering wheel position sensor and a steerable wheel position sensor each produce an electrical signal respectively indicative of the steering wheel position and the position of the steerable wheels. An electronic control unit monitors the sensor signals and controls a solenoid operated directional control valve to steer the vehicle in a direction and at a steering rate in response to the monitored signals. An electromagnetic friction brake is connected to a support and to the input shaft and is controlled by the electronic control unit to provide steering feel. The friction brake includes an armature fixed to the support and a brake member secured for rotation with the input shaft via a spline conneciton. The brake member is movable toward the armature under the influence of the magnetic field generated by the armature. The degree of mechanical coupling between the armature and the brake member is proportional to the magnetic field strength. Steering feel is controlled by the electronic control unit in response to the difference between the desired steering direction, as determined from the steering wheel position sensor, and the actual steering direction, as determined from the steerable wheel position sensor.

15 Claims, 4 Drawing Sheets

APPARATUS FOR ESTABLISHING STEERING FEEL

TECHNICAL BACKGROUND

The present invention relates to a vehicle steering system and is particularly directed to an apparatus for establishing steering feel in a steering system which does not have a mechanical connection between the vehicle steering wheel and the steerable wheels of the vehicle.

BACKGROUND ART

Vehicle steering systems not having a mechanical connection between the steering wheel and the steerable wheels are well known in the art, particularly for use on off-the-road vehicles. Typically, the steerable wheels are moved by means of a hydraulic motor.

Since such systems do not have a mechanical connection between the steering wheel and the steerable wheels, steering feel must be established by other means. One such system is described in U.S. Pat. No. 3,011,579. The steering system described in the '579 patent includes a front wheel servo system including a hydraulic motor operatively connected to the vehicle's steerable front wheels through a gear box. A hydraulic valve directs pressurized fluid to the front wheel hydraulic motor to move the steerable wheels in response to a control signal. A steerable wheel position sensor is connected to the gear box for generating an electrical feedback signal to the front wheel servo system indicative of the position of the steerable front wheels. A steering wheel position sensor generates an electrical signal indicative of the rotational position of the vehicle's steering wheel. A summing circuit within the front wheel servo system monitors the output signal from the steering wheel position sensor and the feedback signal from the steerable wheel position sensor and outputs the control signal to the hydraulic valve of the front wheel hydraulic motor. The control signal is proportional to the difference between the two sensed positions. A feel servo system is provided and includes a second hydraulic motor drivably connected to the steering wheel input shaft through a gear arrangement. A second hydraulic valve directs pressurized fluid to the second hydraulic motor in response to a second control signal. The feel servo system monitors certain vehicle operating parameters and generates the second control signal in response thereto to establish a steering feel.

SUMMARY OF THE INVENTION

The present invention provides a steering apparatus for establishing a steering feel in a steering system which does not have a mechanical connection between the steering wheel and the steerable wheels.

In accordance with the present invention, a steering apparatus is provided for use in a vehicle having steerable wheels, an actuatable steering motor connected to the steerable wheels, and an actuator for actuating the steering motor in response to a steering signal. The apparatus comprises a support and a steering wheel fixed to a steering input shaft. The input shaft is mounted for rotation relative to the support. First sensing means is provided for sensing the rotational position of the input shaft and for generating an electrical signal indicative thereof. Second sensing means is provided for sensing the position of the steerable wheels and for generating an electrical signal indicative thereof. Electromagnetic friction brake means is provided, connected to the input shaft and to the support for providing a controllable amount of mechanical resistance to relative rotation between the steering input shaft and the support responsive to an electrical control signal. Control means is provided for (i) generating the steering signal to actuate the steering motor and (ii) generating the electrical control signal for the electromagnetic friction brake means in response to the electrical signals from the first sensing means and the second sensing means.

In a preferred embodiment of the present invention, a vehicle steering wheel is connected to an input shaft which is mounted for rotation in a stationary steering column located within the passenger compartment of the vehicle. An electromagnetic friction brake is operatively connected to the vehicle input shaft and to the stationary steering column. The electromagnetic friction brake includes a first brake member circumferentially surrounding the input shaft and secured for rotation therewith. The first brake member is made of a magnetically permeable material and includes a friction brake surface. The electromagnetic friction brake further includes an armature secured to the support for generating an electromagnetic field having an electrically controllable field strength responsive to an electrical control signal. The armature includes a friction brake surface located adjacent to the friction brake surface of the first brake member. The first brake member is axially movable toward the armature under the influence of the magnetic field generated by the armature. The degree of mechanical coupling between the first brake member and the armature and, in turn, the steering input shaft and the steering column is proportional to the magnetic field strength generated by the armature.

An electronic control unit monitors the rotational position of the input shaft and the position of the steerable wheels and generates the electrical control signal to control the magnetic field strength generated by the armature of the electromagnetic friction brake in response thereto. The electronic control unit also controls a solenoid operated directional control valve to control communication of the hydraulic steering motor with a pump and a reservoir and, thereby, control the direction and rate of steering of the vehicle.

DESCRIPTION OF THE DRAWINGS

Other features and advantages of the invention will be apparent to those skilled in the art by reference to the following detailed description taken in connection with the accompanying drawings wherein.

DETAILED DESCRIPTION

Figure 1:
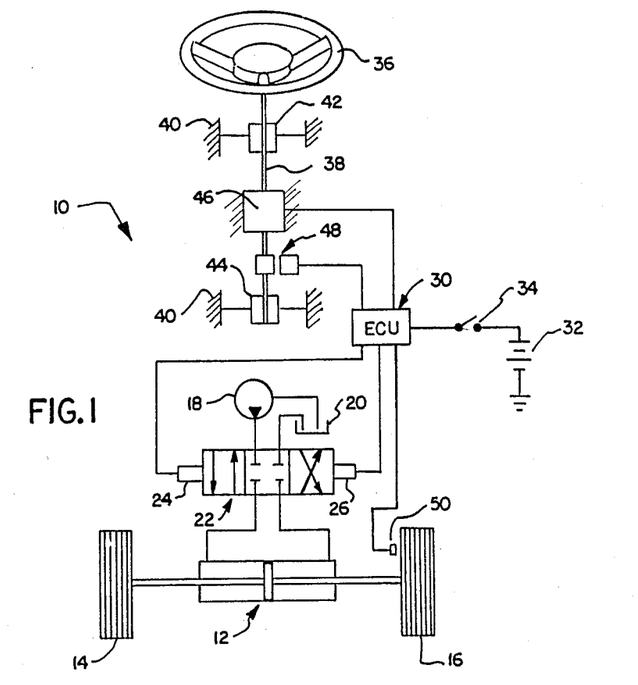
FIG. 1 is a schematic illustration of a steering system embodying the present invention.

Referring to FIG. 1, a steering system 10 for a vehicle, in accordance with the present invention, includes a hydraulic steering motor 12 steerably connected to the vehicle's steerable wheels 14, 16 in a known manner. The steering motor 12 is connected to a pump 18 and to a reservoir 20 through a directional control valve 22. The directional control valve 22 is a solenoid operated valve and includes two oppositely acting solenoids 24, 26 operatively connected to an electronic control unit ("ECU") 30.

The construction and operation of a solenoid operated directional control valve is known in the art and will not be described in detail herein. Basically, the solenoids 24, 26 are actuated by a pulse width modulated ("PWM") electrical signal which is generated in response to a steering control signal. Each solenoid controls communication of fluid pilot pressure which acts on an associated end of a valve spool. Steering direction is controlled by actuation of a selected solenoid. The steering rate is proportional to the amount of fluid flow to and from the steering motor 12 which is controlled by controlling the position of the valve spool. The valve spool position is responsive to the duration of the PWM signal outputted to a solenoid being actuated.

The ECU 30 receives its operating power from the vehicle battery 32 through an ignition switch 34 when the ignition switch 34 is in a RUN position.

A vehicle steering wheel 36 is secured to an end of an input shaft 38 which is rotatably mounted to a stationary support 40 by means of bearings or bushings 42, 44. An electromagnetic friction brake 46 is operatively connected between the support 40 and the input shaft 38. A steering wheel position sensor 48 monitors the rotational position of the input shaft 38 relative to the support 40 and produces an electrical signal indicative thereof. The output signal from the sensor 48 is connected to the ECU 30.

A steerable wheel position sensor 50 is operatively connected to at least one of the steerable wheels 14, 16 and produces an electrical signal indicative of the steering or angular position of the steerable wheels. The steerable wheel position sensor 50 can be any one of several types known in the art, such as a linear potentiometer or a linear voltage differential transformer connected to steering linkage or to the steerable wheel. The output signal of the sensor 50 is connected to the ECU 30.

The ECU 30 monitors the relative rotational position of the input shaft 38 from the output signal of the steering wheel position sensor 48. The ECU 30 also monitors the steering or angular position of the steerable wheels 14, 16. If the ECU 30 determines a difference between the desired steering direction, as determined from the signal from the sensor 48, and the actual steering direction, as determined from the signal from the sensor 50, an appropriate solenoid of the directional control valve is actuated to move the steerable wheels until the actual steering direction is equal to the desired steering direction.

Referring to FIGS. 2-5, a stationary steering column 60 is fixed to the vehicle support 40 by means of bolts 62 mounted through holes 64 in the support 40 and received in threaded bores 66 of the steering column 60. The input shaft 38 has an outer member 70 secured thereto. The bushing 42 is located between the member 70 and the steering column 60 and radially supports the member 70 and the input shaft 38 for rotation relative to the stationary steering column 60. The steering wheel 36 is secured to the member 70 by bolts 74 mounted through holes 76 in the steering wheel 36 and received in threaded bores 78 of the member 70.

An end support member 80 is secured to the steering column 60 by means of bolts 82. The member 80 has a through bore 84 through which the input shaft 38 extends. The bore 84 has bearing surface 44 which radially supports the input shaft 38 for rotation relative to the stationary steering column 60. A nut 86 is received on a threaded end portion 88 of the steering input shaft 38. A washer 90 is positioned between an end 92 of the member 70 and an inner wall surface 94 of the member 80. The input shaft 38 is held axially fixed relative to the steering column 60 by the nut 86.

Figure 2:
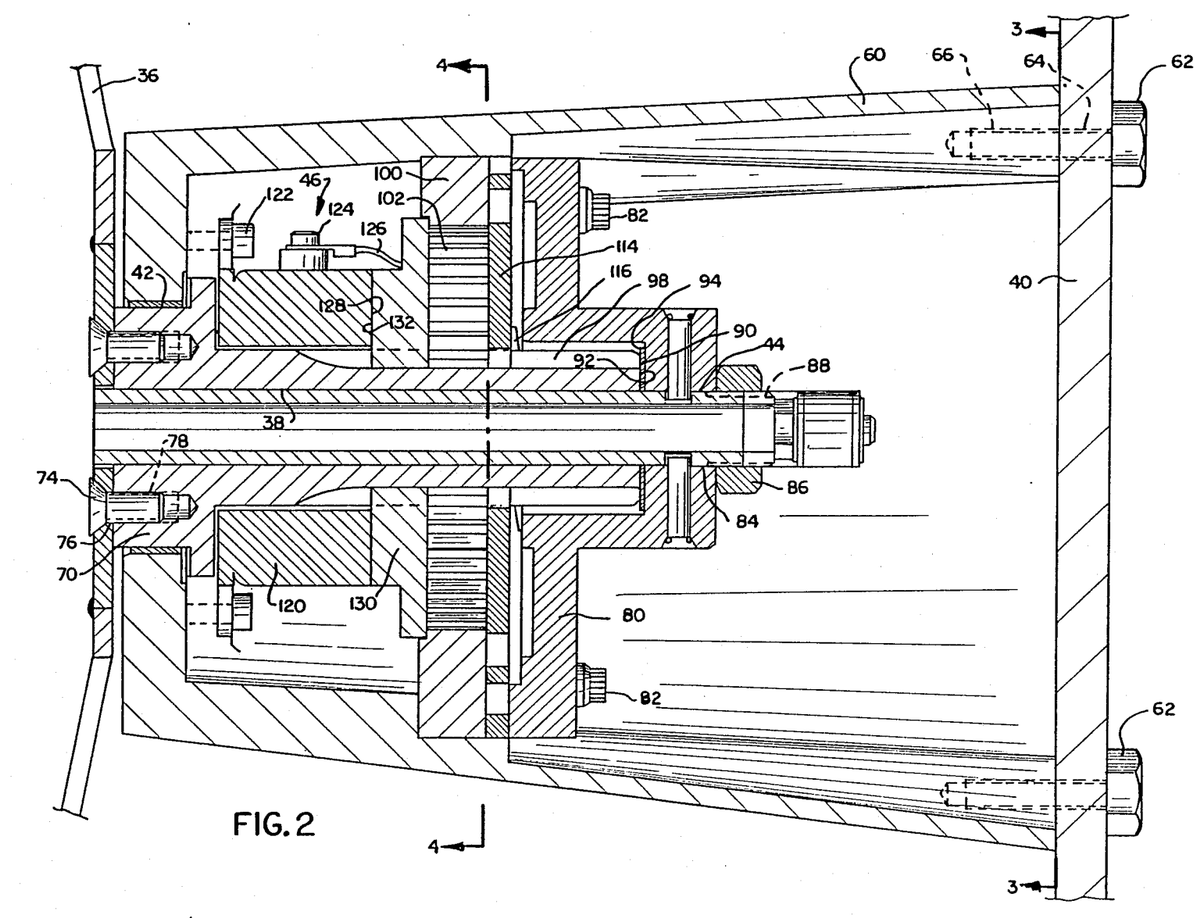
FIG. 2 is a sectional view of a portion of the steering system of the present invention.
Figure 4:
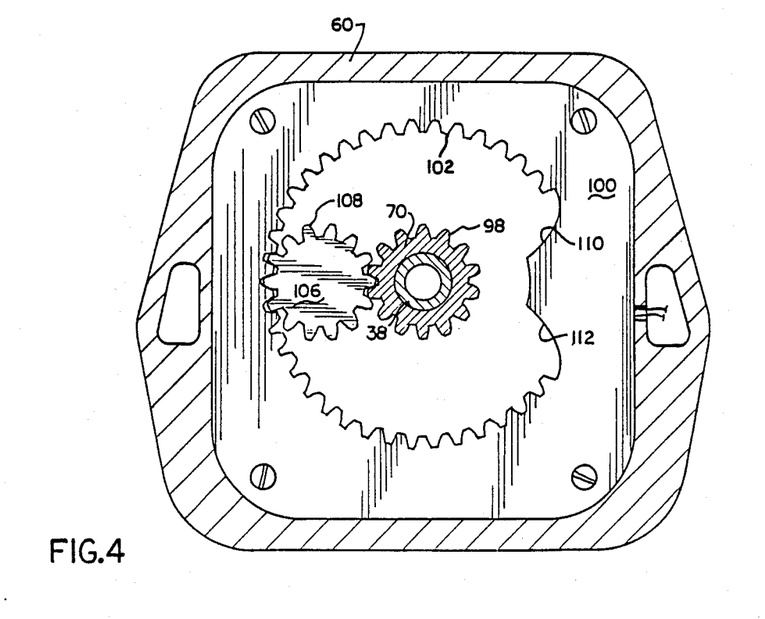
FIG. 4 is a sectional view taken along line 4—4 of FIG. 2.

Referring to FIGS. 2 and 4, a portion of the member 70 has radially projecting spline teeth 98. An outer steering gear 100 is secured in the steering column 60 and circumferentially surrounds the input shaft 38 and the spline teeth 98 of the member 70. The gear 100 has internally directed gear teeth 102. A walking gear 106 has radially projecting teeth 108 and is located between and in meshing engagement with both the spline teeth 98 of the member 70 and the teeth 102 of the gear 100.

As the steering wheel 36 rotates, the member 70 rotates and gear 106 walks around gear 100. The gear 100 includes stop surfaces 110, 112 which define the maximum rotation of the steering wheel 36 in each steering direction. The gears are shown in FIG. 4 when the steering wheel is in a straight-ahead position. The gear ratios, in a preferred embodiment, permit one and one-half revolutions of the steering wheel in each direction from the straight-ahead position before the walking gear 106 contacts a stop surface 110, 112. A cover plate 114 is biased against gear 100 by a wave washer 116 to retain the walking gear 106 axially in one direction. The other side of wave washer 116 contacts the member 80.

Referring to FIG. 2, the electromagnetic friction brake 46 includes an armature 120 circumferentially surrounding the member 70 and secured to the stationary steering column 60 by means of bolts 122. The armature 120 is electrically connected to the ECU 30 via connection terminals 124 (only one shown) and electrical wires 126 (only one shown). The armature 120 includes a friction brake surface 128.

The electromagnetic friction brake 46 further includes a brake member 130 having inwardly projecting gear teeth in meshing engagement with the spline teeth 98 of the member 70. This gearing arrangement causes the brake member 130 and the member 70 to rotate together while permitting the brake member 130 to move axially relative to the steering column 60. The axial movement of the brake member 130 is limited on one side by the armature 120 and on the other side by the combination of gear 100, plate 114, washer 116 and end member 80. The brake member 130 acts to axially retain the walking gear 106 on the side opposite plate 114. The brake member 130 includes a friction brake surface 132 located adjacent the friction brake surface 128 of the armature 120. The brake member 130 is made of a magnetically permeable material and is preferably made of a ferromagnetic material.

The steering wheel 36 and, in turn, input shaft 38 are free to rotate relative to the steering column 60 when the armature is not generating an electromagnetic field. Although the surfaces 128, 132 may be in contact, resistance to rotation of the steering wheel will be minimal. Once the armature 120 generates a magnetic field, the brake member 130 will move against the armature 120 under the influence of the magnetic field. The degree of mechanical coupling between the armature 120 and the brake member 130 is proportional to the strength of the magnetic field. The greater the mechanical coupling between the armature 120 and the brake member 130, the greater the force required to turn the steering wheel 36. Therefore, steering feel, i.e., resistance to turning of the steering wheel, is controllable by controlling the magnetic field strength generated by the armature 120. The magnetic field strength is controlled by the ECU 30 in response to the signals from the steering wheel position sensor 48 and the steerable wheel position sensor 50 in a manner described below.

Figure 3:
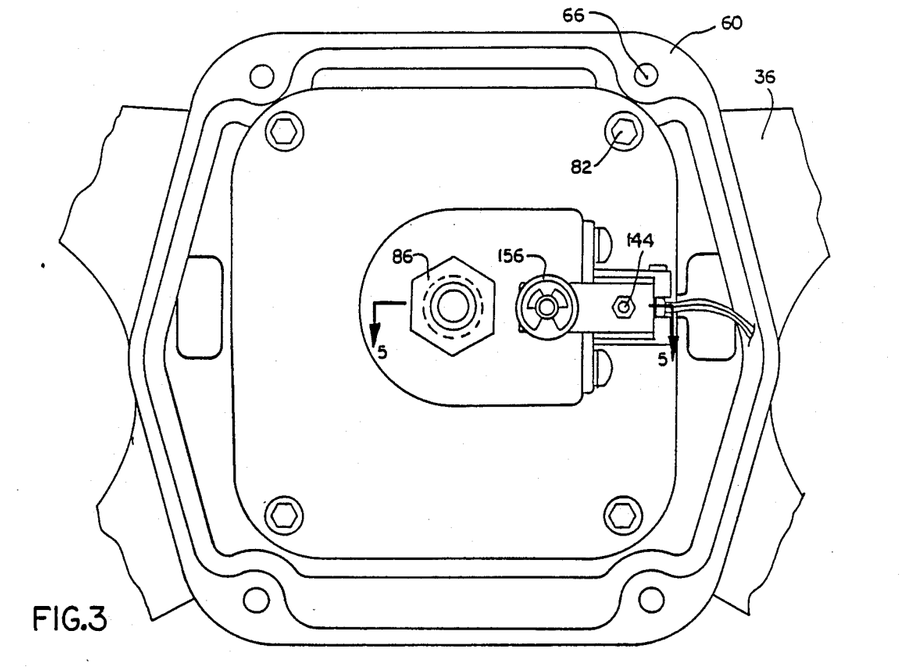
FIG. 3 is a view taken along line 3—3 of FIG. 2.
Figure 5:
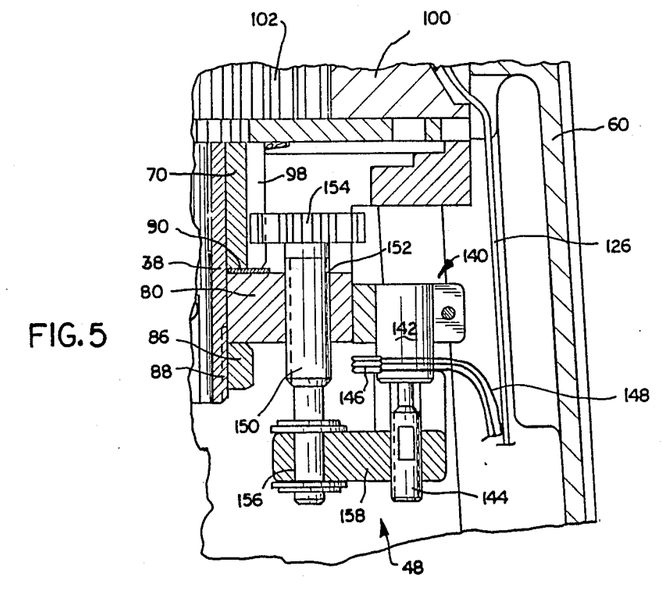
FIG. 5 is a sectional view taken along line 5—5 of FIG. 3.

Referring to FIGS. 2, 3, and 5, the steering wheel position sensor 48 includes a linear potentiometer 140 secured to the member 80. Linear potentiometers are well known in the art and will not be described in detail herein. Basically, the linear potentiometer 140 includes a main body portion 142, a movable wiper arm 144, and an electrical connector 146. Electrical impedance across the contacts of the connector 146 vary in a linear relationship with the position of the wiper arm 144. The electrical connector 146 is connected to the ECU 30 through wiring 148. The ECU 30 uses the linear potentiometer 140 as part of a voltage dividing network.

The sensor 48 further includes a positioning member 150 threadably received in a bore 152 of the member 80. One end of the positioning member 150 has a gear 154 secured thereto and in meshing engagement with the spline teeth 98 of the member 70. As the steering wheel 36 is rotated, the input shaft 38 and the member 70 also rotate. As member 70 rotates, the positioning member 150 rotates, thereby moving the member 150 axially as it is screwed in and out of threaded bore 152.

The other end of the positioning member 150 includes a coupling portion 156 which holds a connecting member 158. Connecting member 158 is keyed to the wiper arm 144 of the linear potentiometer 140. As the positioning member 150 assumes an axial position in proportion to the rotational position of the steering wheel 36, the wiper arm 144 of the potentiometer 140 will commensurately assume an axial position. Since the potentiometer is used as part of a voltage dividing network by the ECU 30, the ECU 30 can determine the rotational position of the steering wheel 36 and input shaft 38 by measuring the voltage outputted from the voltage dividing network.

Figure 6:
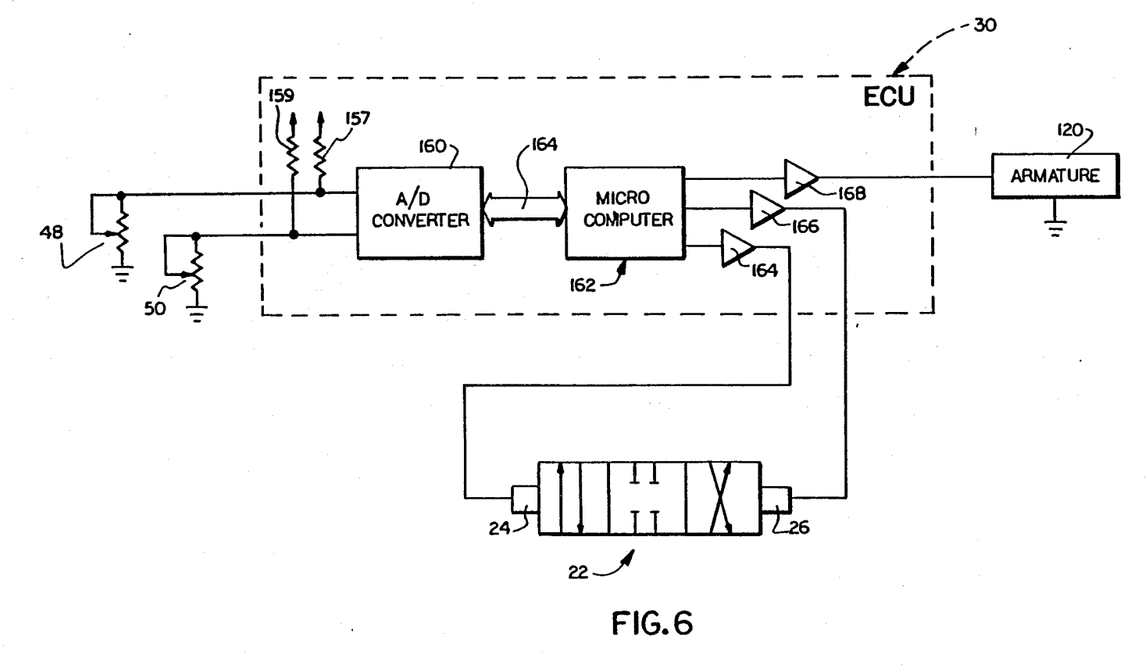
FIG. 6 is a schematic illustration of a control circuit embodying the present invention.

Referring to FIG. 6, the ECU includes pull-up resistors 157, 159 respectively connected to the sensors 48, 50. A voltage is produced at each resistor/sensor junction having a magnitude respectively proportional to the rotation position of the steering wheel or the position of the steerable wheels. The ECU 30 includes an A/D converter 160 that monitors the signal from the voltage dividing network including the steering wheel position sensor 48 and the signal from the voltage dividing network including the steerable wheel position sensor 50. The A/D converter 160 converts the monitored signals into digitized numeric values. Such A/D converters are well known in the art. There are several A/D converters that can be used with the present invention, such as a Motorola MC14444 Analog-to-Digital Converter manufactured by Motorola Semiconductor Products Inc., or a National Semiconductor Analog-to-Digital Converter ADC0830. The output of the A/D converter is connected to a microcomputer 162 via an input/output (I/0) bus 164. There are several microcomputers that can be used with the present invention including a Motorola MC68091U4CP1.

The microcomputer determines the desired steering direction from the monitored signal from the voltage dividing network including the steering wheel position sensor and compares that against the actual steering direction determined from the monitored signal from the voltage dividing network including the steerable wheel position sensor. The microcomputer 162 outputs, if necessary, an appropriate PWM signal to the solenoid 24 through a power amplifier 164 or to the solenoid 26 through a power amplifier 166, depending on the steering direction.

As mentioned above, the microcomputer 162 controls the magnetic field strength generated by the armature 120 and thereby controls the steering feel. Steering feel is the resistance to rotation exhibited by the steering wheel. The microcomputer 162 generates a PWM signal to the armature to establish a predetermined minimum resistance to rotation of the steering wheel and, thereby, establishes a minimum steering feel. The PWM signal for the minimum steering feel causes the armature to generate a predetermined minimum magnetic field. The brake member 130 moves toward the armature 120 with the friction surfaces 128, 132 contacting each other. The resultant coefficient of friction between surfaces 128, 132 is proportional to the field strength. The microcomputer 162 also controls the directional control valve 22 responsive to direction and rate of rotation of the steering wheel.

During rapid rotation of the steering wheel 36, the response time of the steering system may result in the steering movement of the steerable wheels lagging behind the steering wheel rotation. The microcomputer 162 by periodic monitoring of the voltages produced by the two voltage dividing networks that include the sensors 48, 50 determines the amount of such steering lag. The microcomputer 162 increases the steering feel in proportion to the determined steering lag. The steering resistance is increased by increasing the magnetic field strength generated by the armature 120. The magnetic field strength is increased by increasing the ON time of the PWM signal which is connected to the armature 120 through a power amplifier 168. Once the steering lag returns to zero, the microcomputer 162 will, again, maintain a predetermined minimum steering feel.

The microcomputer 162 includes an internal memory which stores data indicative of steering feel versus steering lag. The stored data is used by the microcomputer 162 to control the duty cycle of the PWM signal outputted to the armature 120.

Although the invention has been described with reference to a preferred embodiment, other modifications and alterations will be apparent to those skilled in the art upon reading and understanding this specification. It is our intention to include all such modifications and alterations insofar as they come with the scope of the appended claims. For example, a hydraulic motor has been described for moving the steerable wheels of the vehicle. An electric motor could be used where the ECU 30 would output appropriate electrical drive signals to control direction and steering rate.

We claim:

1. A steering apparatus for use in a vehicle having steerable wheels, an actuatable steering motor connected to the steerable wheels, and an actuator for actuating the steering motor in response to a steering signal, said apparatus comprising:

a support;

a steering input shaft rotatable relative to said support by a vehicle operator;

first sensing means for sensing the rotational position of said input shaft and for producing an electrical signal indicative thereof;

second sensing means for sensing the position of the steerable wheels and for producing an electrical signal indicative thereof;

electromagnetic friction brake means connected to said input shaft and said support for providing a controllable amount of mechanical resistance to relative rotation between said steering input shaft and said support responsive to an electrical control signal; and control means for (i) generating said steering signal to actuate the steering motor and (ii) generating said electrical control signal responsive to the electrical signals from said first sensing means and said second sensing means.

2. The steering apparatus of claim 1 wherein said electromagnetic friction brake means comprises a first brake member made of a magnetically permeable material and secured to one of said input shaft or said support, said first brake member including a friction brake surface, a second brake member secured to the other of said input shaft or said support and including means for generating a magnetic field having an electrically controllable field strength responsive to said electrical control signal and a friction brake surface located adjacent the friction brake surface of said first brake member, said first brake member and said second brake member being axially movable relative to each other under the influence of said magnetic field, the degree of coupling between said first brake member and said second brake member being proportional to said field strength.

3. The steering apparatus of claim 2 wherein said first brake member is secured for rotation to said input shaft and said second brake member is secured to said support.

4. The steering apparatus of claim 1 wherein said input shaft includes a portion having radially projecting spline teeth and wherein said first brake member circumferentially surrounds said portion of said input shaft and includes inwardly directed teeth in meshing engagement with said spline teeth of said input shaft, said first brake member being axially slidable along said input shaft.

5. The steering apparatus of claim 1 wherein a portion of said input shaft includes radially projecting, spline gear teeth and said first sensing means includes a positioning member threadably received in a threaded bore in said support and having gear teeth meshingly engaged with the spline gear teeth of said input shaft so that rotary motion of said input shaft rotates said positioning member, said rotary movement of said positioning member causing said positioning member to thread into and out of said threaded bore thereby moving said positioning member axially relative to said support, and wherein said first sensing means includes electrical measuring means for measuring the axial position of said positioning member, the produced electrical signal from said first sensing means being proportional to the axial position of said positioning member relative to said support.

6. The steering apparatus of claim 5 wherein said electrical measuring means is a linear potentiometer having a linearly movable wiper arm coupled to said positioning member.

7. The steering apparatus of claim 6 wherein said linear potentiometer is part of a voltage dividing network, said produced signal from said first sensing means being derived from said voltage dividing network.

8. The steering apparatus of claim 1 wherein a portion of said input shaft includes gear teeth, said apparatus further including a steering limit gear surrounding said portion of said input shaft and fixed to said support, said steering limit gear having inwardly directed gear teeth radially spaced from said gear teeth of said input shaft, said gear teeth of said steering limit gear being bounded by stop surfaces, and a walking gear in meshing engagement with both said gear teeth of said input shaft and said inwardly directed teeth of said steering limit gear, said walking gear traversing said gear teeth of said steering limit gear upon rotation of said input shaft relative to said support, the number of revolutions of said input shaft with respect to said support being limited in a direction by said walking gear contacting an associated stop surface of said steering limit gear.

9. The steering apparatus of claim 1 wherein said first sensing means is a potentiometer fixed to said support and operatively connected to said input shaft so that rotation of said input shaft effects an impedance change across operating terminals of said potentiometer.

10. A steering apparatus for use in a vehicle having steerable wheels, an actuatable steering motor connected to the steerable wheels, and an actuator for actuating the steering motor in response to a steering signal, said apparatus comprising:

a support;

a steering input shaft mounted for rotation relative to said support by a vehicle operator;

electromagnetic friction brake means connected to said input shaft and said support for providing a controllable amount of mechanical resistance to relative rotation between said steering input shaft and said support responsive to an electrical control signal for controlling steering feel, said electromagnetic friction brake means comprising a first brake member made of a magnetically permeable material and secured to one of said input shaft or said support, said first brake member including a friction brake surface, a second brake member secured to the other of said input shaft or said support and including means for generating a magnetic field having an electrically controllable field strength responsive to said electrical control signal and a friction brake surface located adjacent the friction brake surface of said first brake member, said first brake member and said second brake member being axially movable relative to each other under the influence of said magnetic field, the degree of coupling between said first brake member and said second brake member being proportional to said field strength.

11. The steering apparatus of claim 10 wherein said first brake member is secured for rotation to said input shaft and said second brake member is secured to said support.

12. The steering apparatus of claim 10 wherein said input shaft includes a portion having radially projecting spline teeth and wherein said first brake member circumferentially surrounds said portion of said input shaft and includes inwardly directed teeth in meshing engagement with said spline teeth of said input shaft, said first brake member being axially slidable upon said input shaft.

13. The steering apparatus of claim 10 further including first sensing means for monitoring the rotational position of said input shaft and for producing an electrical signal indicative thereof, and wherein a portion of said input shaft includes gear teeth and said first sensing means includes a positioning member threadably received in a threaded bore in said support and having gear teeth meshingly engaged with the gear teeth of said input shaft, rotary motion of said input shaft resulting in rotary and axial movement of said positioning member, and wherein said first sensing means includes means for producing an electrical signal responsive to the axial position of said positioning member, the produced electrical signal from said first sensing means being proportional to the position of said positioning member.

14. The steering apparatus of claim 13 wherein said means for producing said electrical signal is a linear potentiometer having a linearly movable wiper arm fixed to said positioning member.

15. The steering apparatus of claim 10 wherein a portion of said input shaft includes gear teeth, said apparatus further including a steering limit gear surrounding said portion of said input shaft and fixed to said support, said steering limit gear having inwardly directed gear teeth radially spaced from said gear teeth of said input shaft, said gear teeth of said steering limit gear being bounded by stop surfaces, and a walking gear in meshing engagement with both said gear teeth of said input shaft and said inwardly directed teeth of said steering limit gear, said walking gear traversing said gear teeth of said steering limit gear upon rotation of said input shaft relative to said support, the number of revolutions of said input shaft with respect to said support being limited in a direction by said walking gear contacting an associated stop surface of said steering limit gear.

* * * * *

UNITED STATES PATENT AND TRADEMARK OFFICE
CERTIFICATE OF CORRECTION

PATENT NO. : 4,771,846
DATED : September 20, 1988
INVENTOR(S) : Fredrick D. Venable, et al.

It is certified that error appears in the above-identified patent and that said Letters Patent are hereby corrected as shown below:

Column 7, line 40, change "1" to -- 2 --.

Signed and Sealed this

Second Day of May, 1989

*Attest:*

DONALD J. QUIGG

*Attesting Officer*     *Commissioner of Patents and Trademarks*